United States Patent
Le et al.

(10) Patent No.: US 7,484,756 B2
(45) Date of Patent: Feb. 3, 2009

(54) VEHICLE SIDE IMPACT CRASH DETECTION FOR DEPLOYMENT OF CURTAIN AND SIDE AIRBAGS

(75) Inventors: Jialiang Le, Canton, MI (US); Cliff C. Chou, Farmington Hills, MI (US); Todd Nelson Clark, Dearborn, MI (US); Rachelle Nicole Tustanowski, Livonia, MI (US); Saeed David Barbat, Farmington Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 11/732,235

(22) Filed: Apr. 3, 2007

(65) Prior Publication Data

US 2008/0249687 A1    Oct. 9, 2008

(51) Int. Cl.
*B60R 21/16* (2006.01)
(52) U.S. Cl. ............... 280/735; 180/274; 701/45
(58) Field of Classification Search ........ 280/734, 280/735; 180/274, 282; 701/45; 340/436, 340/438
See application file for complete search history.

(56) References Cited

U.S. PATENT DOCUMENTS

| | | | | |
|---|---|---|---|---|
| 3,889,232 A * | 6/1975 | Bell | .......... | 280/735 |
| 5,338,062 A * | 8/1994 | Kiuchi et al. | .......... | 280/735 |
| 5,428,534 A * | 6/1995 | Wetzel et al. | .......... | 701/46 |
| 5,684,336 A * | 11/1997 | McCurdy | .......... | 307/10.1 |
| 5,748,075 A * | 5/1998 | Dirmeyer et al. | .......... | 340/436 |
| 5,793,005 A * | 8/1998 | Kato | .......... | 200/61.45 R |
| 6,095,553 A * | 8/2000 | Chou et al. | .......... | 280/735 |
| 6,274,948 B1 * | 8/2001 | Blank et al. | .......... | 307/10.1 |
| 6,487,482 B1 * | 11/2002 | Mattes et al. | .......... | 701/45 |
| 6,520,536 B2 * | 2/2003 | Foo et al. | .......... | 280/735 |
| 6,553,295 B1 * | 4/2003 | Bauch et al. | .......... | 701/45 |
| 6,898,498 B1 | 5/2005 | Wessels et al. | | |
| 2004/0065497 A1 | 4/2004 | Roelleke et al. | | |
| 2004/0182627 A1 | 9/2004 | Bujak | | |
| 2005/0206142 A1 | 9/2005 | Prakah-Asante et al. | | |
| 2005/0269809 A1 | 12/2005 | Gaukel et al. | | |
| 2006/0244245 A1 * | 11/2006 | Nonaka et al. | .......... | 280/735 |

\* cited by examiner

*Primary Examiner*—Toan C To
(74) *Attorney, Agent, or Firm*—Franklin A. MacKenzie; Ford Global Technologies LLC

(57) ABSTRACT

A restraint control system (40) for an automotive vehicle (10) is illustrated with a first sensor such as a door cavity pressure sensor (28) and a second sensor such as an accelerometer (30). A restraint device (54) is coupled to a controller (52) that controls the operation of the restraint device in response to the first sensor (28) and the second sensor (30). When either the signal from the first sensor or the signal from the second sensor is above a first or second threshold, respectively, the two signals are compared. In response to the comparison, the restraint device (54) is deployed.

20 Claims, 5 Drawing Sheets

US 7,484,756 B2

VEHICLE SIDE IMPACT CRASH DETECTION FOR DEPLOYMENT OF CURTAIN AND SIDE AIRBAGS

TECHNICAL FIELD OF THE INVENTION

The present invention relates generally to restraint systems for automotive vehicles, and more specifically, to a system that uses two sensors to determine a crash event. The crash event is sensed and the level of the crash event is compared to crash event levels in memory and an appropriate response is initiated based upon the sensed level of crash event.

BACKGROUND OF THE INVENTION

Automotive vehicles are required to include passenger and driver front airbags. Many vehicles now also include side airbags or side curtain airbags. Such systems typically include an accelerometer that measures the lateral acceleration to determine the presence of a crash event. Typically, an accelerometer is located on each side of the vehicle to determine if enough deceleration is present to deploy the corresponding airbag.

Other systems use two sensors such as a pressure sensor that measures the air pressure of the cavity of a door or other enclosed space and an accelerometer that measures lateral acceleration of the vehicle. Such systems deploy the airbag when either one of the sensors senses a crash event. In automotive vehicles, typically more than one type of restraint device is employed. These devices are suitable for different crash situations.

There is a need to provide for a vehicle side impact crash detection system that provides for an appropriate response to a crash event based upon comparison of the crash event with various levels of crash events preloaded into a Restraint Control Module (RCM) with memory so that the appropriate passive and active safety measures can be activated in response to the sensed crash event.

BRIEF SUMMARY OF THE INVENTION

The present invention provides an improved deployment system that uses two sensors to measure different crash characteristics and the signal from the measured crash event is compared to various levels of crash events stored in the RCM to provide a particular type or series of deployments corresponding to a particular event mode in response to the measured sensor signals as compared to the level of the crash event in the RCM.

In one aspect of the invention, a system for an automotive vehicle having a door includes a first sensor that generates a first signal corresponding to a first crash characteristic and a second sensor generating a second signal corresponding to a second crash characteristic that is different than the first crash characteristic. The system also includes a restraint device and a controller that is coupled to the restraint device, the first sensor, and the second sensor. When either the first signal is above a first threshold or the second signal is above a second threshold, comparing the first signal and the second signal against a level of crash event stored in a table in the memory of and RCM. The deployment of the restraint device is performed in response to the comparison of the first signal and the second signal with the appropriate level of crash event stored in the RCM memory.

One advantage of the invention is that by comparing each of the pressure signal and acceleration signal, a comparison is made to crash events stored in the RCM and a determination is made as to what part of the vehicle is involved in a crash event and whether or not to deploy a particular restraint device.

Another advantage of the invention is that by using the signals from both sensors, the type of crash may be categorized. By categorizing the crash, appropriate timing, deployments and non-deployments may be made based upon a comparison to stored crash event levels in the RCM.

Other advantages and features of the present invention will become apparent when viewed in light of the detailed description of the preferred embodiment when taken in conjunction with the attached drawings and appended claims

DETAILED DESCRIPTION

Figure 1:
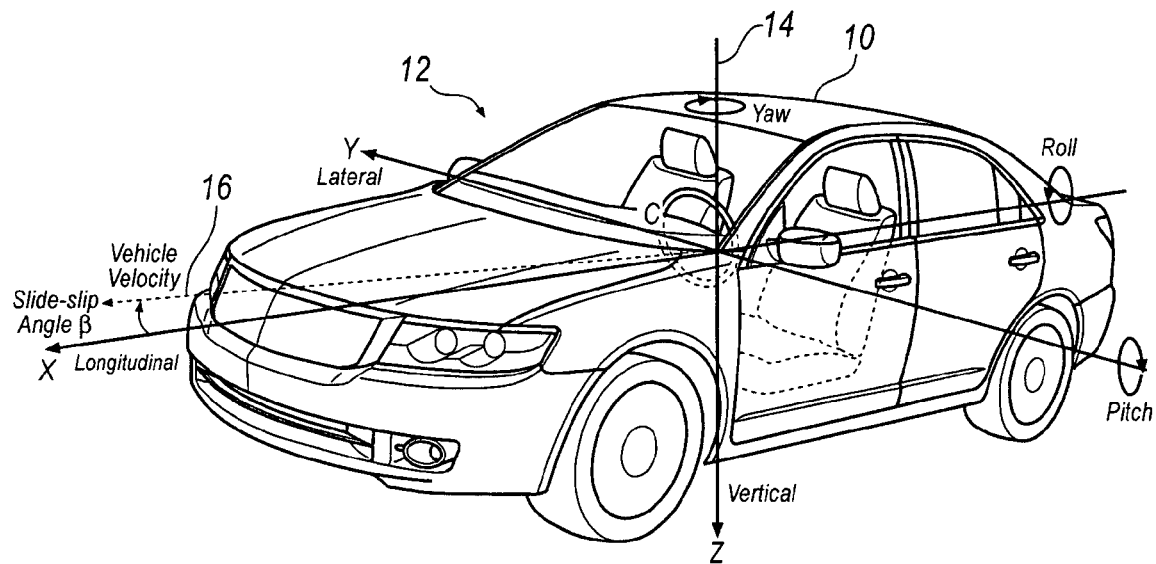
FIG. 1 is a perspective view of a vehicle having the various directions and dynamic forces relative to a vehicle axis centered at the center of gravity of the vehicle.

In the following figures, the same reference numerals will be used to identify the same components of the various views. The following figures are illustrated with respect to pressure and acceleration sensors. However, those skilled in the art will recognize the teachings set forth herein are applicable to various types of sensors. Also, the present invention may be used alone or with other types of safety systems or in combination with other sensors in the vehicle to provide different functions.

Referring now to FIG. 1, automotive vehicle 10 is illustrated with respect to a vehicle coordinate system 12. Vehicle coordinate system 12 has a longitudinal axis X, a lateral axis Y, and a vertical axis Z. The origin of each of the axes is the center of gravity 14 of automotive vehicle 10. Roll is the motion about the longitudinal axis X, yaw is the motion about the vertical axis Z, and pitch is the motion about the lateral axis Y. A side slip angle $\beta$. is the angle between the X axis and the direction of vehicle velocity illustrated by arrow 16. It should be noted that acceleration and deceleration are used interchangeably. The difference in a mathematical sense is the sign which corresponds to a difference in direction.

Figure 2:
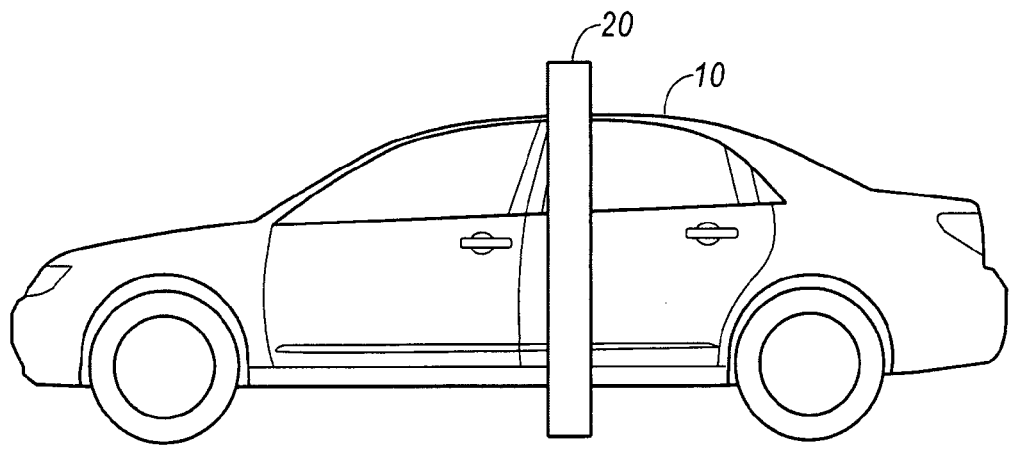
FIG. 2 is a side view of an automotive vehicle relative to a pole demonstrating one event mode.

Referring now to FIG. 2, automotive vehicle 10 is illustrated relative to pole 20. A collision with pole 20 illustrates one type of event mode that may be sensed by the present invention as will be further described below.

Figure 3:
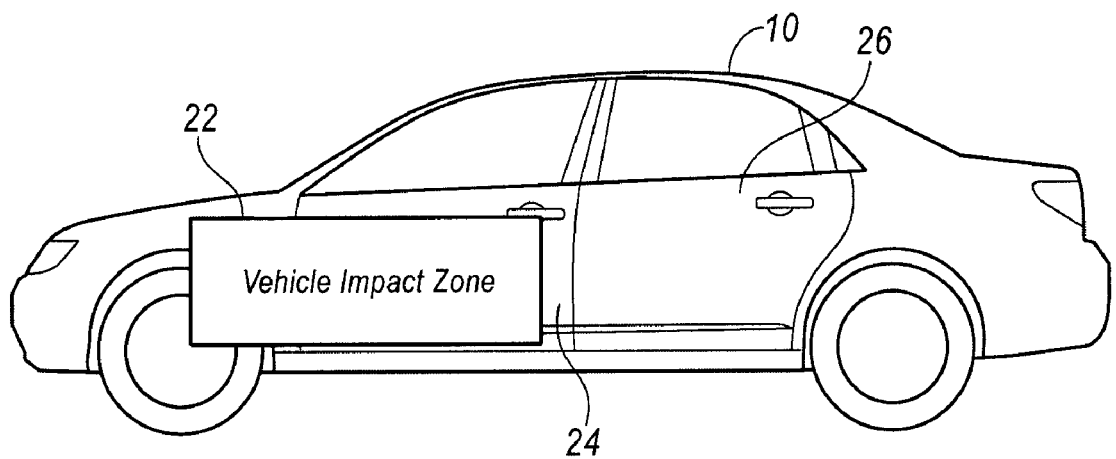
FIG. 3 is a side view of an automotive vehicle illustrating a vehicle impact zone illustrating a second event mode.

FIG. 3 illustrates a vehicle impact zone 22 that represents the potential area for another vehicle to impact vehicle 10. This represents another event mode. Vehicle impact zone 22 is shown with respect to front door 24. Of course, rear door 26 may also have a vehicle impact zone sensed by rearwardly placed sensors as will be described below.

Figure 4:
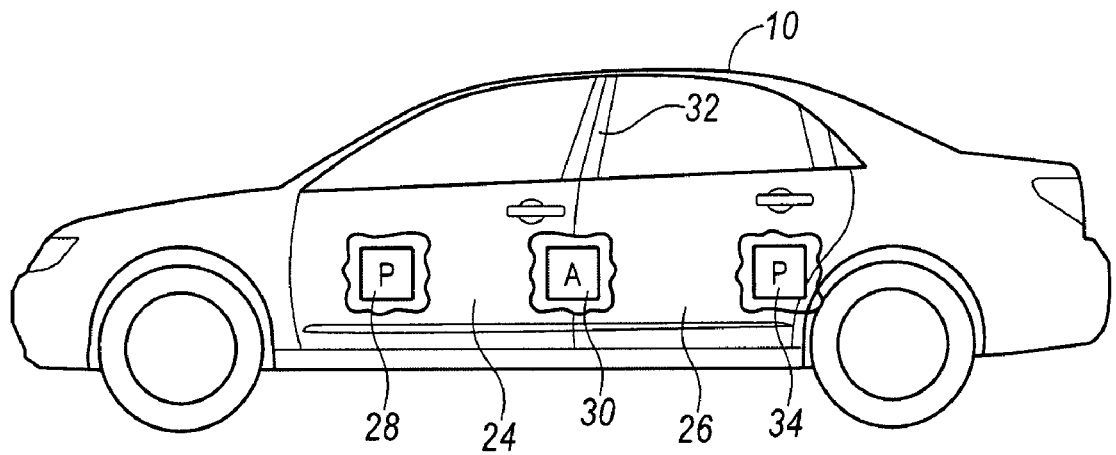
FIG. 4 is a partial cutaway side view of an automotive vehicle showing different placements of pressure sensors and an accelerometer.

Referring now to FIG. 4, automotive vehicle 10 is shown having a first door pressure sensor 28 and an accelerometer 30. Door pressure sensor 28 is used to generate a pressure signal corresponding to the pressure within the door 24. Accelerometer sensor 30 is located in a B pillar 32 of automotive vehicle 10. Accelerometer sensor 30 generates a lateral acceleration signal for the vehicle. An optional second door pressure sensor 34 is located in rear door 26. Second door pressure sensor 34 generates a pressure signal corresponding to the pressure within rear door 26. It should be noted that in FIG. 4, one side of the vehicle is illustrated. The same sensors may also be used on the opposite sides of the vehicle and the opposite doors and opposite B pillar. Depending on the conditions, door pressure sensors 28 and 34 and accelerometer sensor 30 may provide various levels of indication of a crash depending on the type of crash.

Figure 5:
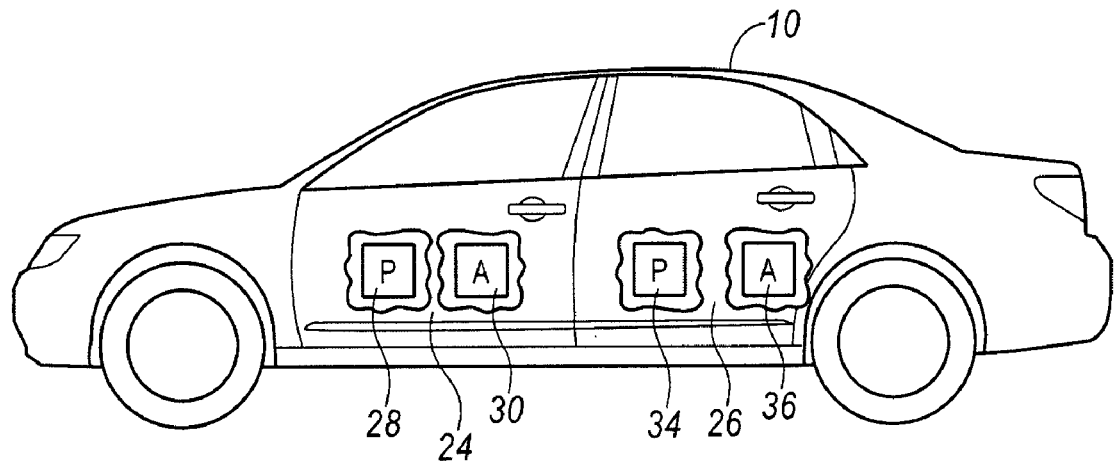
FIG. 5 is a partial cutaway side view of an automotive vehicle illustrating alternative locations of pressure sensors and accelerometers.

Referring now to FIG. 5, vehicle 10 is illustrated having first pressure sensor 28, second pressure sensor 34 located in respective front door 24 and rear door 26. First accelerometer 30 is positioned within door 24 rather than on B pillar 32 as shown in FIG. 4. A second accelerometer 36 is positioned in rear door 26. Of course, pressure sensor 34 and accelerometer 36 may be optional in various systems.

Figure 6:
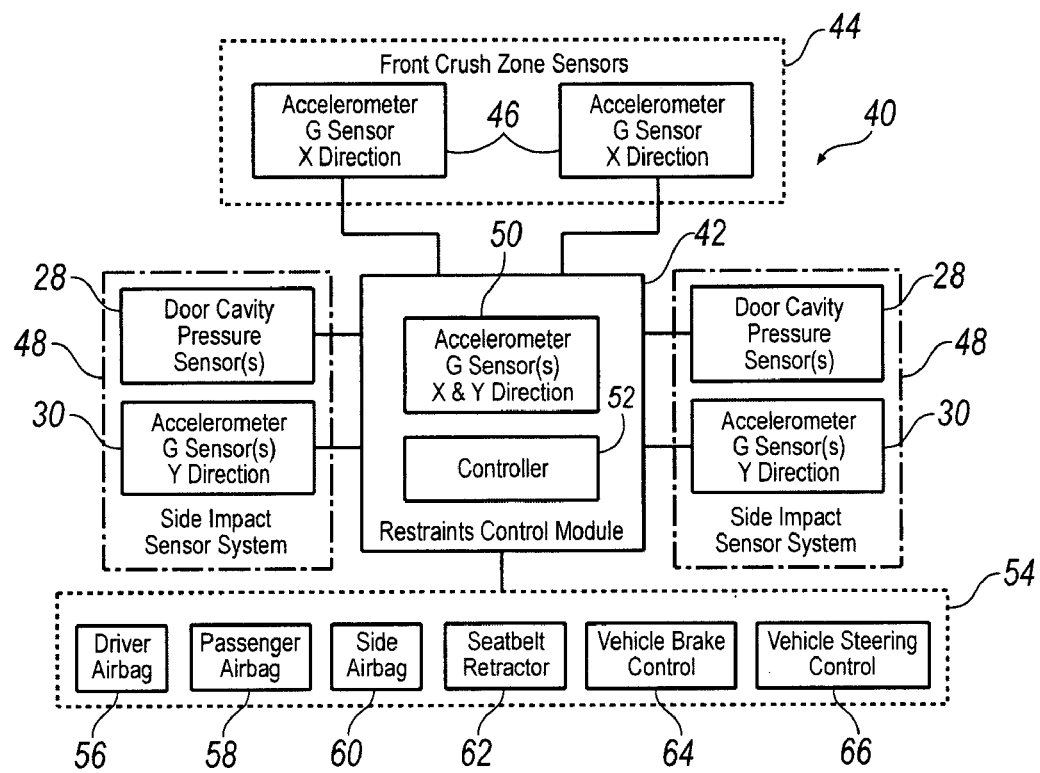
FIG. 6 is a block diagrammatic view of a side impact crash detection system for deployment of side curtains and side air bags.

Referring now to FIG. 6, a restraint control system 40 has a restraint control module 42 therein. Restraint control module 42 is preferably microprocessor-based. In response to various sensors, the restraint control module controls various restraints in the vehicle. Restraint control module 42 may be coupled to the pressure sensors and accelerometer sensors that together provide the signal indicative of the level of crash to be compared against the crash levels stored in the ECU memory.

Two side impact sensor systems 48 may also be coupled to restraints control module 42. Side impact sensor systems 48 may include a door pressure sensor or sensors 28 such as those described above, and accelerometers sensors 30, 34 as described above.

In addition, a centrally located accelerometer 50 may be used to generate acceleration signals in both the X and Y direction.

As mentioned above, restraints control module 42 preferably has a microprocessor represented by controller 52. Of course, controller 52 has associated memory and timing devices associated with a conventional microprocessor. Restraints control module 42 is used to control various restraints 54 of the vehicle. Restraints 54 may include but are not limited to a driver airbag 56, a passenger airbag 58, a side airbag or plurality of side airbags 60, a seat belt retractor 62, vehicle brake control 64, and vehicle steering control 66. It should be noted that side airbag 60 and seat belt retractor 62 may include more than one. Vehicle brake control 64 and vehicle steering control 66 represent various control systems of the vehicle that may be activated in response to a sensed crash condition to control the ultimate position of the vehicle.

Figure 6A:
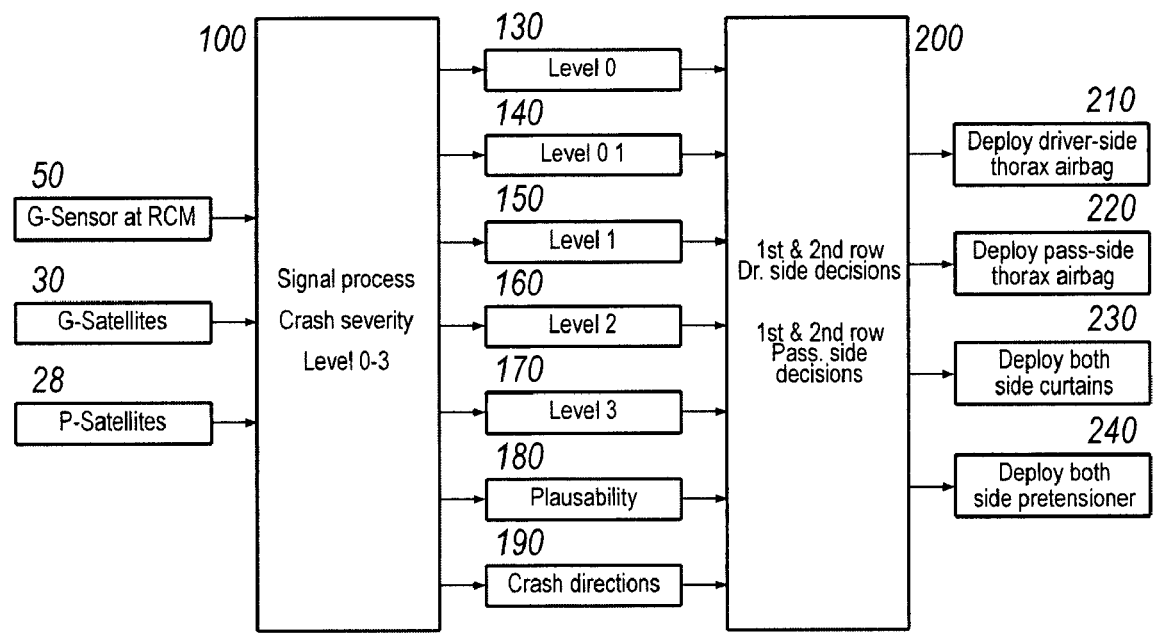
FIG. 6A is a more detailed block diagrammatic view of a side impact crash detection system for deployment of side curtains and side airbags that occurs within the Restraint Control Module controller.

FIG. 6A illustrates a block diagram of a side impact detection system for the deployment of side curtain and side airbags that occurs within the Restrain Control Module controller 52 of FIG. 6. Specifically, pressure sensors and accelerometer sensors from three locations (i.e., two pressure sensors, two accelerometer sensors and the accelerometer of the RCM) are used to provide signals that cover side crash zones of the passenger compartment of a vehicle. Upon obtaining the signals, the system starts processing the signals in processor 100 and defining the crash zone severities 130, 140, 150, 160, 170, 180 and 190, respectively, based upon the category of the crash severity and the modes of the crash event. The microprocessor applies different computations for the discrimination of side impact crash signals, such as integration, differentiation etc. The signals are categorized to the level of severities and side crash characteristics, and then, against the thresholds for different crash level severity. At the same time, the signals are passed through a plausibility check as well as a crash direction calculation. The systems can also sense what portion of the vehicle was involved in the impact events. Once the vehicle side impact crash has been confirmed, a decision is made and a trigger signal is sent to deploy required restraint systems.

Figure 7:
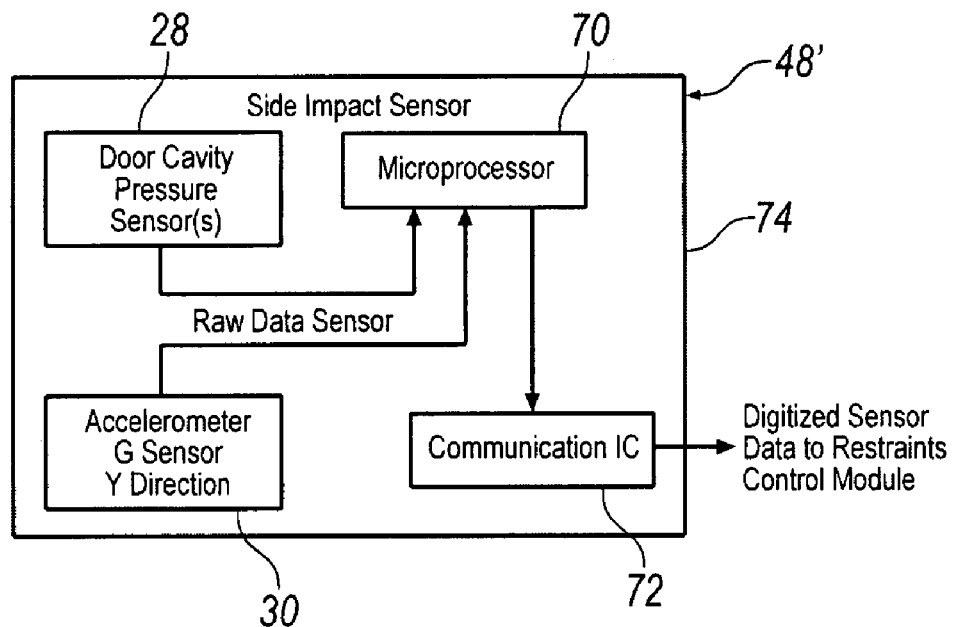
FIG. 7 is a block diagrammatic view of an alternative sensor configuration according to the present invention.

Referring now to FIG. 7, an alternative embodiment of a side impact sensor 48' is illustrated. In this embodiment door cavity pressure sensor or sensors 28 and accelerometer sensor 30 are located together with a microprocessor 70 that receives raw sensor data from both the door cavity pressure sensor 28 and accelerometer sensor 30. Microprocessor 70 converts the signals into a digital signal that is coupled to a communication integrated circuit (IC) 72. The communication integrated circuit 72 transmits the digitized sensor data to restraints control module 42 shown in FIG. 6. It should be noted that door cavity pressure sensor 28, accelerometer 30, microprocessor 70, and communication integrated circuit 72 may be located within a common housing 74.

Figure 8:
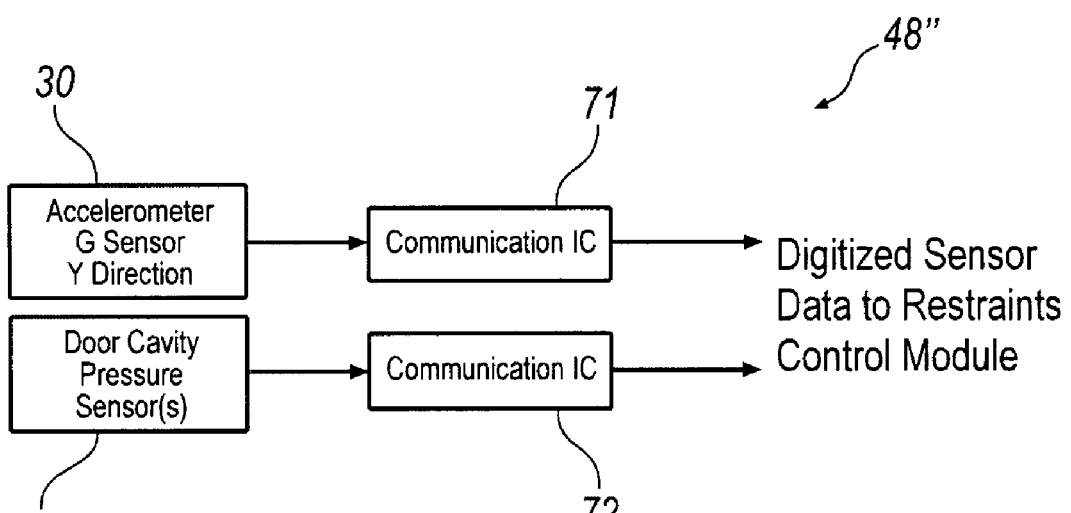
FIG. 8 is a block diagrammatic view of another sensor configuration according to the present invention.

Referring now to FIG. 8, another alternative embodiment of side impact sensor 48" is illustrated. In this embodiment, door cavity pressure sensor 28 and accelerometer 30 are located outside a module housing 76. Microprocessor 70 and communication IC 72 are located within the module housing 76. The output of communication IC 72 is coupled to the restraints control modules 42 as described above.

Figure 9:
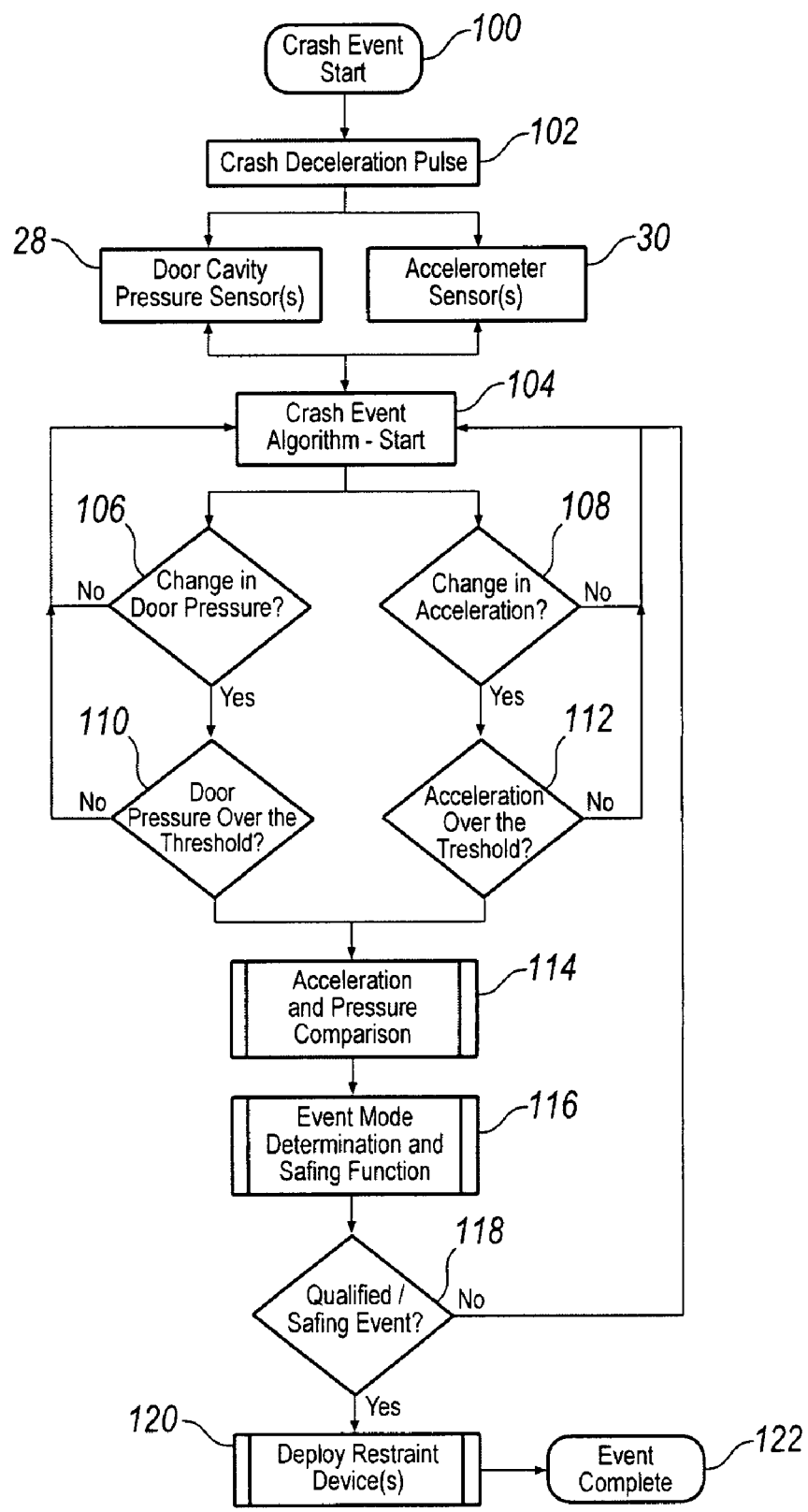
FIG. 9 is a flow chart illustrating a method for operating a restraint device according to the present invention.

Referring now to FIG. 9, the operation of the restraints control module is illustrated. In step 100 the crash event is started. In step 102 a crash deceleration pulse is applied to the vehicle 10. Door cavity pressure sensors 28 and accelerometer sensors 30 generate respective signals which start a crash event algorithm 104. A change in door pressure in step 106 and a change in acceleration in step 108 are parallel paths through the crash event algorithm. When the door pressure sensor indicates a pressure greater than a first pressure threshold in step 110, or the accelerometer 30 indicates acceleration in excess of a second acceleration threshold in step 112, the acceleration and pressure are compared in step 114. In step 114, by comparing the acceleration and pressure from the door cavity pressure signals 28 and the accelerometer 30, a safing mode is entered. That is, if a high level of pressure change is detected, some deceleration of the vehicle in the lateral direction may also be detected. If some change in acceleration is detected, some change in door pressure indicating a crash may also be detected. Thus, erroneous signals may be removed from consideration. Of course, these considerations are based on the vehicle and the number of sensors employed. Each different type of vehicle may include a different set of threshold, acceleration, and pressure parameters.

In step 116, the characteristics of the pressure and acceleration signals are conducted to the ECU memory wherein various crash levels are entered into a table in memory. The crash characteristics of the pressure and accelerometer signals are compared to the various crash event levels stored in the ECU memory and an appropriate crash event restraint deployment is performed and may be used to determine an event mode. Various types of event modes including but not limited to those illustrated in FIGS. 2 and 3 may be formed. That is, when the vehicle hits a pole sideways, one set of deployment criteria may be employed. When a vehicle is hitting the front quarter and/or front door of the vehicle or the rear quarter of the vehicle, another two types of event modes may be entered. Again, the various types of event modes and the sequence of deployment and the timing of the deployment varies based upon the vehicle model. Such values may be easily determined in pre-production testing. Step 116 may also perform the safing function described above with respect to step 114. In step 118 if during the safing function the event mode is not a qualified event, step 104 is executed. In step 118 if the event mode indicates a qualified event, various restraints such as those described above may be deployed in step 120. Of course, the timing and sequence of the deployments may be varied. Also, the number of restraint devices may also be varied. In step 122 the event is complete.

As can be seen by the above description, the various advantages of characterization and safing using at least two sensors is evident. Those skilled in the art will recognize that various embodiments such as that shown in FIG. 5 with more than one pressure sensor and more than one accelerometer may be used in the determination. Forward passengers and rearward passengers may then be protected in a different manner corresponding to their seating positions relative to the crash event.

While particular embodiments of the invention have been shown and described, numerous variations and alternate embodiments will occur to those skilled in the art. Accordingly, it is intended that the invention be limited only in terms of the appended claims.

What is claimed as new and desired to be protected by Letters Patent of the United States is:

1. A system of sensors installed in an automotive vehicle door to detect vehicle side impact for deployment of side impact restraints comprising: a first sensor generating a first signal corresponding to a first crash characteristic; a second sensor generating a second signal corresponding to a second crash characteristic different than the first crash characteristic; a restraint device; and a controller having a memory with tables categorizing vehicle crash severity levels resident therein; said controller coupled to said first sensor, said second sensor and said restraint device, said controller compares said first and second signals to a vehicle crash severity level in said memory and deploys said restraint device in accordance with said vehicle crash severity level stored in memory.

2. A system as recited in claim 1 wherein said first sensor comprises a pressure sensor.

3. A system as recited in claim 1 wherein said first crash characteristic comprises pressure.

4. A system as recited in claim 1 wherein said second sensor comprises a lateral acceleration sensor.

5. A system as recited in claim 1 wherein said second crash characteristic comprises lateral acceleration.

6. A system as recited in claim 1 wherein said first sensor and said second sensor are electronically connected to a sensor processor for generating a first digital sensor signal and a second digital sensor signal in response to said first sensor signal and the second sensor signal, respectively.

7. A system as recited in claim 1 wherein said restraint device is at least one of a driver airbag, passenger airbag, side airbag, side curtain airbag, seat belt retractor, vehicle brake controller.

8. A system as recited in claim 1 wherein said controller categorizes crash severity according to levels and computes the occurrence of side impact events with said levels.

9. A system to deploy vehicle occupant restraint devices in vehicle side impact events, comprising: a first door pressure cavity sensor generating a first pressure signal corresponding to a pressure within the door; a first accelerometer generating a first acceleration signal corresponding to lateral acceleration of a vehicle; a second accelerometer sensor for generating a second acceleration signal corresponding to lateral and longitudinal acceleration of the vehicle; a restraint device; and a controller coupled to said first door pressure cavity sensor, said first accelerometer, said second accelerator sensor and said restraint device, when the pressure signal and the acceleration signal is received by said controller and compared to crash severity levels stored within a memory in said controller, and deploying a restraint device in response to comparing.

10. A system as recited in claim 9 wherein said controller categorizes an event mode in response to the pressure signal and the acceleration signal and deploys the restraint device in response to comparing and categorizing the event mode.

11. A system as recited in claim 9 further comprising a second door pressure cavity sensor generating a second pressure signal and a second accelerometer generating a second acceleration signal coupled to said controller.

12. A system as recited in claim 11 wherein said controller deploys the restraint device in response to said second acceleration signal and said second pressure signal.

13. A system as recited in claim 9 wherein said accelerometer is disposed within a B-pillar.

14. A system as recited in claim 9 wherein said first door pressure cavity sensor and said first accelerometer are coupled to a sensor processor for generating a digital pressure sensor signal and a digital acceleration signal in response to said pressure signal and said acceleration signal, respectively.

15. A system as recited in claim 9 wherein said restraint device is at least one of a driver airbag, passenger airbag, side airbag, side curtain airbag, seat belt retractor, vehicle brake controller.

16. A system as recited in claim 9 wherein said pressure sensor is located in a front door of the vehicle.

17. A system as recited in claim 9 wherein said pressure sensor is located in a rear door of the vehicle.

18. A method of operating a restraint device comprising: generating a pressure signal corresponding to a pressure within a door; generating an acceleration signal corresponding to lateral acceleration of a vehicle; transmitting said signals to a controller with a memory having crash severity levels resident therein; computing the crash severity levels; comparing the computed crash severity level against the crash severity levels in memory; and deploying a restraint device in response to comparing.

19. A method as recited in claim 18 further comprising categorizing an event mode in response to the pressure signal and the acceleration signal; and wherein the deploying a restraint device comprises deploying a restraint device in response to comparing and categorizing.

20. The system of claim 9 wherein the crash severity levels are categorized and stored in a table in the memory.

* * * * *